(12) United States Patent
Strandborg et al.

(10) Patent No.: US 11,170,678 B2
(45) Date of Patent: Nov. 9, 2021

(54) DISPLAY APPARATUS AND METHOD INCORPORATING GAZE-BASED MODULATION OF PIXEL VALUES

(71) Applicant: Varjo Technologies Oy, Helsinki (FI)

(72) Inventors: Mikko Strandborg, Hangonkylä (FI); Ville Miettinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/162,020

(22) Filed: Jan. 29, 2021

(65) Prior Publication Data

US 2021/0248941 A1    Aug. 12, 2021

Related U.S. Application Data

(63) Continuation-in-part of application No. 16/783,557, filed on Feb. 6, 2020, now Pat. No. 11,056,030.

(51) Int. Cl.
*G09G 5/02* (2006.01)
*G09G 5/10* (2006.01)
(Continued)

(52) U.S. Cl.
CPC .............. *G09G 3/007* (2013.01); *G06F 3/013* (2013.01); *G09G 3/3607* (2013.01); *G09G 2320/0242* (2013.01); *G09G 2340/0407* (2013.01)

(58) Field of Classification Search
CPC ..................................................... G06F 3/013
See application file for complete search history.

(56) References Cited

U.S. PATENT DOCUMENTS

| | | |
|---|---|---|
| 5,742,264 A | 4/1998 | Inagaki et al. |
| 6,456,340 B1 * | 9/2002 | Margulis .................. G06T 1/20 345/501 |

(Continued)

FOREIGN PATENT DOCUMENTS

WO    2013171168 A1    11/2013

OTHER PUBLICATIONS

International Search Report and Written Opinion of the International Searching Authority, Application No. PCT/FI2021/050082, dated Apr. 23, 2021, 19 pages.

(Continued)

*Primary Examiner* — Nan-Ying Yang
(74) *Attorney, Agent, or Firm* — Ziegler IP Law Group, LLC

(57) ABSTRACT

A display apparatus including gaze-tracking means, image renderers, liquid-crystal devices including liquid-crystal structure and control circuit, to shift light emanating from given pixel of image renderer to multiple positions, given pixel including colour component; and processor configured to: process gaze-tracking data to determine gaze direction of user's eye; determine gaze point; display first output image frame; detect if magnitude of difference between first output value and initial second output value of colour component of given pixel in first and second output image frames exceeds first threshold difference; when detected that magnitude of difference exceeds first threshold difference, update initial second output value to sum of first output value and product of distance factor and difference between initial second output and first output values; and display second output image frame.

20 Claims, 5 Drawing Sheets

(51) Int. Cl.
  *G09G 5/00*   (2006.01)
  *G09G 3/00*   (2006.01)
  *G06F 3/01*   (2006.01)
  *G09G 3/36*   (2006.01)

(56) References Cited

U.S. PATENT DOCUMENTS

| | | |
|---|---|---|
| 9,710,887 B1 | 7/2017 | Sahlsten et al. |
| 2017/0270637 A1 | 9/2017 | Perreault et al. |
| 2018/0053284 A1 | 2/2018 | Rodriguez et al. |
| 2018/0075820 A1 | 3/2018 | Hicks et al. |
| 2018/0136471 A1* | 5/2018 | Miller ................ G02B 27/0093 |
| 2019/0243134 A1 | 8/2019 | Perreault et al. |
| 2019/0318677 A1 | 10/2019 | Lu et al. |
| 2019/0354173 A1 | 11/2019 | Young et al. |

OTHER PUBLICATIONS

Notification of Transmittal of the International Search Report and the Written Opinion of the International Searching Authority, or the Declaration, Application No. PCT/FI2020/050073, dated Apr. 30, 2021, 17 pages.
PCT, Notification of Transmittal of The International Search Report and The Written Opinion of The International Searching Authority, or The Declaration, Application No. PCT/FI2021/050085, dated Jun. 14, 2021, 29 pages.

* cited by examiner

DISPLAY APPARATUS AND METHOD INCORPORATING GAZE-BASED MODULATION OF PIXEL VALUES

CROSS-REFERENCE TO RELATED APPLICATIONS

This application is a continuation-in-part of U.S. patent application Ser. No. 16/783,557, titled "DISPLAY APPARATUS AND METHOD OF ENHANCING APPARENT RESOLUTION USING LIQUID-CRYSTAL DEVICE" and filed on Feb. 6, 2020, which is incorporated herein by reference.

TECHNICAL FIELD

The present disclosure relates to display apparatuses incorporating gaze-based modulation of pixel values. Moreover, the present disclosure relates to methods of displaying that are implemented via such display apparatuses.

BACKGROUND

In recent times, immersive technologies such as virtual-reality, augmented-reality, mixed-reality (collectively referred to as extended-reality (XR) technology) are being used to present interactive XR environments to users in various fields such as entertainment, real-estate, combat training, medical imaging operations, simulators, navigation, and the like. Typically, the users utilize XR devices (for example, such as an XR headset, a pair of XR glasses, and the like) for experiencing and interacting with such XR environments. In use, the user generally wears an XR device on his/her head.

Conventional XR devices employ various equipment and techniques to generate and display images that constitute the XR environment. Some XR devices employ pixel-shifting technology wherein light emanating from a given pixel of an image renderer (for example, such as a display, a projector, and the like) is shifted to multiple positions for providing an apparent spatial super-resolution.

However, provision of high spatial resolutions for the images using the pixel-shifting technology has certain problems associated therewith. For some XR devices that employ the pixel-shifting technology, the image renderers produce colour reproduction artifacts in the images due to poor response time of such image renderers. Generally, the image renderers use response time compensation in order to mitigate said artifacts in the images and to improve perceived colour depth in the image. However, such response time compensation is performed uniformly for an entirety of the images, and thus is well suited to provide only a limited perceived colour depth (namely, a limited colour reproduction capability) in the images being displayed via the image renderer. In such a case, the displayed images are suboptimal in terms of colour reproduction. Moreover, use of the response time compensation using very high setting levels also produces undesirable effects (such as corona effects) in the images. For example, leading edges of moving content in the images may be overshot in the images. Such undesirable effects deteriorate immersiveness and realism of the users within the XR environments.

Therefore, in light of the foregoing discussion, there exists a need to overcome the aforementioned drawbacks associated with provision of colours in high-resolution images in specialized devices.

SUMMARY

The present disclosure seeks to provide a display apparatus incorporating gaze-based modulation of pixel values. The present disclosure also seeks to provide a method of displaying that is implemented via such display apparatus. An aim of the present disclosure is to provide a solution that overcomes at least partially the problems encountered in prior art.

In one aspect, an embodiment of the present disclosure provides a display apparatus comprising:
  gaze-tracking means;
  an image renderer per eye;
  a liquid-crystal device comprising a liquid-crystal structure and a control circuit, wherein the liquid-crystal structure is arranged in front of an image-rendering surface of the image renderer, wherein the liquid-crystal structure is to be electrically controlled, via the control circuit, to shift light emanating from a given pixel of the image renderer to a plurality of positions in a sequential and repeated manner, the given pixel comprising at least one colour component; and
  at least one processor configured to:
    process gaze-tracking data, collected by the gaze-tracking means, to determine a gaze direction of a user's eye;
    determine, based on the gaze direction of the user's eye, a gaze point on an image plane of the image-rendering surface at which the user is gazing;
    display a first output image frame via the image renderer;
    detect whether or not a magnitude of a difference between a first output value of a given colour component of the given pixel in the first output image frame and an initial second output value of the given colour component of the given pixel in a second output image frame exceeds a first threshold difference, wherein the second output image frame is to be displayed subsequent to the first output image frame;
    when it is detected that the magnitude of the difference between the first output value and the initial second output value exceeds the first threshold difference, update the initial second output value in the second output image frame to a sum of the first output value and a product of a distance factor and a difference between the initial second output value and the first output value, wherein the distance factor is a function of a distance of the given pixel from the gaze point on the image plane; and
    display the second output image frame via the image renderer.

In another aspect, an embodiment of the present disclosure provides a method of displaying, via a display apparatus comprising gaze-tracking means, an image renderer per eye, and a liquid-crystal device comprising a liquid-crystal structure and a control circuit, wherein the liquid-crystal structure is arranged in front of an image-rendering surface of the image renderer, the method comprising:
  electrically controlling the liquid-crystal structure, via the control circuit, to shift light emanating from a given pixel of the image renderer to a plurality of positions in a sequential and repeated manner, the given pixel comprising at least one colour component;
  processing gaze-tracking data, collected by the gaze-tracking means, to determine a gaze direction of a user's eye;
  determining, based on the gaze direction of the user's eye, a gaze point on an image plane of the image-rendering surface at which the user is gazing;

displaying a first output image frame via the image renderer;

detecting whether or not a magnitude of a difference between a first output value of a given colour component of the given pixel in the first output image frame and an initial second output value of the given colour component of the given pixel in a second output image frame exceeds a first threshold difference, wherein the second output image frame is to be displayed subsequent to the first output image frame;

when it is detected that the magnitude of the difference between the first output value and the initial second output value exceeds the first threshold difference, updating the initial second output value in the second output image frame to a sum of the first output value and a product of a distance factor and a difference between the initial second output value and the first output value, wherein the distance factor is a function of a distance of the given pixel from the gaze point on the image plane; and displaying the second output image frame via the image renderer.

Embodiments of the present disclosure substantially eliminate or at least partially address the aforementioned problems in the prior art, and enable presentation of high-quality and high colour-depth visual scenes that are generated by way of modulating pixel values of image frames based on the gaze direction of user's eye, via the display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 5A illustrates a given output image frame, while

Figure 1:
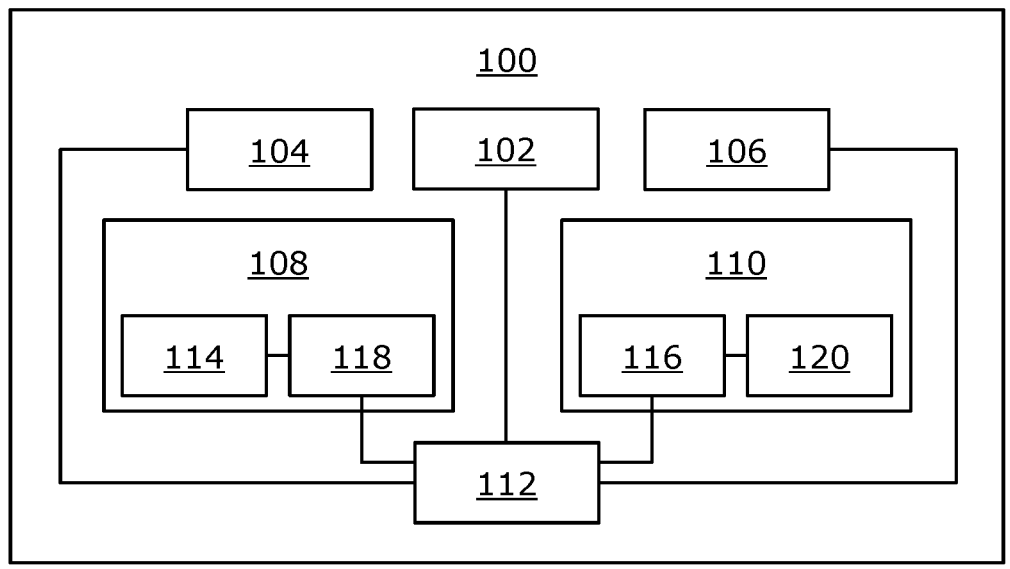
FIG. 1 illustrates a block diagram of architecture of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:

gaze-tracking means;

an image renderer per eye;

liquid-crystal device comprising a liquid-crystal structure and a control circuit, wherein the liquid-crystal structure is arranged in front of an image-rendering surface of the image renderer, wherein the liquid-crystal structure is to be electrically controlled, via the control circuit, to shift light emanating from a given pixel of the image renderer to a plurality of positions in a sequential and repeated manner, the given pixel comprising at least one colour component; and at least one processor configured to:

process gaze-tracking data, collected by the gaze-tracking means, to determine a gaze direction of a user's eye;

determine, based on the gaze direction of the user's eye, a gaze point on an image plane of the image-rendering surface at which the user is gazing;

display a first output image frame via the image renderer;

detect whether or not a magnitude of a difference between a first output value of a given colour component of the given pixel in the first output image frame and an initial second output value of the given colour component of the given pixel in a second output image frame exceeds a first threshold difference, wherein the second output image frame is to be displayed subsequent to the first output image frame;

when it is detected that the magnitude of the difference between the first output value and the initial second output value exceeds the first threshold difference, update the initial second output value in the second output image frame to a sum of the first output value and a product of a distance factor and a difference between the initial second output value and the first output value, wherein the distance factor is a function of a distance of the given pixel from the gaze point on the image plane; and display the second output image frame via the image renderer.

In another aspect, an embodiment of the present disclosure provides a method of displaying, via a display apparatus comprising gaze-tracking means, an image renderer per eye, and a liquid-crystal device comprising a liquid-crystal structure and a control circuit, wherein the liquid-crystal structure is arranged in front of an image-rendering surface of the image renderer, the method comprising:

electrically controlling the liquid-crystal structure, via the control circuit, to shift light emanating from a given pixel of the image renderer to a plurality of positions in a sequential and repeated manner, the given pixel comprising at least one colour component;

processing gaze-tracking data, collected by the gaze-tracking means, to determine a gaze direction of a user's eye;

determining, based on the gaze direction of the user's eye, a gaze point on an image plane of the image-rendering surface at which the user is gazing;

displaying a first output image frame via the image renderer;

detecting whether or not a magnitude of a difference between a first output value of a given colour component of the given pixel in the first output image frame and an initial second output value of the given colour component of the given pixel in a second output image frame exceeds a first threshold difference, wherein the second output image frame is to be displayed subsequent to the first output image frame;

when it is detected that the magnitude of the difference between the first output value and the initial second output value exceeds the first threshold difference, updating the initial second output value in the second output image frame to a sum of the first output value and a product of a distance factor and a difference between the initial second output value and the first output value, wherein the distance factor is a function of a distance of the given pixel from the gaze point on the image plane; and displaying the second output image frame via the image renderer.

The present disclosure provides the aforementioned display apparatus and the aforementioned method of displaying. Herein, the magnitude of the difference between the first output value and the initial second output value of the given colour component of the given pixel is compared with the first threshold difference, to update the initial second output value in the second output image frame using the distance factor, when said magnitude exceeds the first threshold difference. This allows for enhanced colour reproduction capabilities in the image renderer as output values of colour components of pixels in the second output image frame are modulated based on the gaze direction of user's eye for perceiving a high color depth in the second output image frame. Such modulation is implemented non-uniformly across pixels of the second output image frame, to provide varied and realistic colour reproduction by the image renderer. Beneficially, this provides immersiveness and realism within a visual scene of the XR environment. Moreover, the display apparatus and the method employ pixel-shifting technology for providing an apparent spatial super-resolution that is higher than the display resolution of the image renderer. The method is fast, reliable and can be implemented with ease.

Throughout the present disclosure, the term "display apparatus" refers to a display system that is configured to present an extended-reality (XR) environment to the user when the display apparatus, in operation, is used by the user. Herein, the term "extended-reality" encompasses virtual reality (VR), augmented reality (AR), mixed reality (MR), and the like.

In one implementation, the display apparatus is implemented as a head-mounted device (HMD) and a computer coupled to the HMD. In one case, the HMD comprises the gaze-tracking means, the image renderer per eye, and the liquid-crystal device, while the computer comprises the at least one processor. Therefore, computational tasks pertaining to presentation of the XR environment are entirely performed at the computer, by the at least one processor. In another case, the HMD comprises the gaze-tracking means, the image renderer per eye, the liquid-crystal device, and the at least one processor is implemented at both the HMD and the computer. Therefore, computational tasks pertaining to presentation of the XR environment are performed in a shared manner at both the HMD and the computer, by the at least one processor. The computer may be coupled to the HMD wirelessly and/or in a wired manner. Examples of the computer include, but are not limited to, a desktop computer, a laptop computer, a tablet computer, a workstation, and an XR console.

In another implementation, the display apparatus is implemented as an HMD. In such a case, the HMD comprises the gaze-tracking means, the image renderer per eye, the liquid-crystal device per eye, and the at least one processor. Therefore, computational tasks pertaining to presentation of the XR environment are entirely performed at the HMD, by the at least one processor.

It will be appreciated that the HMD is worn by the user on his/her head. The HMD is implemented, for example, as an XR headset, a pair of XR glasses, and the like, that is operable to display a visual scene of the XR environment to the user.

Throughout the present disclosure, the term "gaze-tracking means" refers to a specialized equipment for detecting and/or following gaze of the user, when the HMD in operation is worn by the user. The gaze-tracking means could be implemented as contact lenses with sensors, cameras monitoring a position of a pupil of the user's eye, and the like. Such gaze-tracking means are well-known in the art. Notably, the gaze-tracking means is configured to collect the gaze-tracking data. It will be appreciated that the gaze-tracking data is collected repeatedly by the gaze-tracking means throughout a given session of using the display apparatus, as gaze of the user's eyes keeps changing whilst he/she uses the display apparatus. An up-to-date gaze-tracking data indicative of the gaze direction of the user allows for producing an up-to-date gaze-contingent XR environment for presenting at the HMD.

Throughout the present disclosure, the term "image renderer" refers to equipment that, in operation, renders (i.e. displays and/or projects) output image frames that are to be shown to the user of the display apparatus. Herein, the term "output image frame" refers to an image frame that serves as an output to be displayed by the image renderer. Notably, a plurality of output image frames constitutes the visual scene of the XR environment. The "image rendering surface" of the image renderer refers to a surface of the image renderer from which light of the rendered output image frames emanates. It will be appreciated that the image renderer has model-specific characteristics pertaining to response time.

Optionally, the image renderer is implemented as a display. In this regard, a given output image frame is displayed at the display. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Optionally, the display has a multi-layered structure. Optionally, the image renderer is implemented as a projector. In this regard, a given output image frame is projected onto a projection screen or directly onto a retina of the user's eyes. Examples of the projector include, but are not limited to, an LCD-based projector, an LED-based projector, an OLED-based projector, an LCoS-based projector, a Digital Light Processing (DLP)-based projector, and a laser projector.

Optionally, the image renderer could be a multi-resolution image renderer, or a single-resolution image renderer. Multi-resolution image renderers are configured to render output image frames at two or more display resolutions, whereas single-resolution image renderers are configured to render output image frames at a single display resolution only. Herein, the "display resolution" of the image renderer refers to a total number of pixels in each dimension of the image renderer, or to a pixel density (namely, a number of pixels per unit distance or area) in the image renderer. The image renderer generally comprises a plurality of pixels, wherein the plurality of pixels are arranged in a required manner (for example, such as a rectangular two-dimensional grid).

Throughout the present disclosure, the term "colour component" refers to a given colour channel of the given pixel, wherein the given colour channel is a separately addressable single-color picture element. In some implementations, the given pixel comprises one colour component (namely, a single colour component). In other implementations, the given pixel comprises a plurality of colour components (namely, multiple colour components). The plurality of colour components are arranged in a required form (for example, such as a one-dimensional array, a two-dimensional grid, a PenTile® matrix layout, and the like). Optionally, the given pixel comprises 3 colour components. As an example, the given pixel may comprise a red colour component, a green colour component, and a blue colour component. As another example, the given pixel may comprise a cyan colour component, a magenta colour component, and a yellow colour component. Alternatively, optionally, the given pixel comprises 5 colour components. Optionally, in this regard, the 5 sub-pixels comprise two red colour components, two green colour components, and one blue colour component that are arranged in the PenTile® matrix layout. A "colour component" of the given pixel may be understood to be a "sub-pixel" of the given pixel.

It will be appreciated that a given colour component of the given pixel is associated with a given output value or an initial given output value that is indicative of brightness (namely, an intensity) of the given colour component of the given pixel. It will be appreciated that the given output value or the initial given output value of the given colour component of the given pixel could be represented using any number of bits, for example, such as 8 bits, 10 bits, 16 bits, 32 bits, and the like. Optionally, the at least one processor is configured to normalize the given output value and/or the initial given output value of the given colour component of the given pixel to lie in a range of 0 to 1. Optionally, in this regard, the at least one processor employs at least one normalization function for said normalization. The at least one normalization function would map the given output value and/or the initial given output value of the given colour component that lies in a first range (for example, a range of 0 to 255, or a range of 0 to 1023, or similar) to a corresponding output value that lies in the range of 0 to 1. Here in the range of 0 to 1, 0 indicates lowest brightness value of the given colour component of the given pixel, while 1 indicates highest brightness value of the given colour component of the given pixel. For example, the given output value and/or the initial given output value of the given colour component of the given pixel may be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1.

Throughout the present disclosure, the term "liquid-crystal device" refers to a device that enables shifting of light passing therethrough using a liquid-crystal medium. The liquid-crystal device can be understood to steer the light passing therethrough. The liquid-crystal structure contains the liquid-crystal medium. In operation, the control circuit applies electrical signals to control the liquid-crystal medium contained within the liquid-crystal structure in a required manner, so as to shift light emanating from the given pixel of the image renderer to the plurality of positions in the sequential and repeated manner. Optionally, the electrical signals applied by the control circuit control an orientation of liquid-crystal molecules of the liquid-crystal medium. It will be appreciated that the liquid-crystal device is optimized according to the image renderer. For optimum functioning of the display apparatus, the liquid-crystal device is designed according to the display resolution of the image renderer. Optionally, the light emanating from the given pixel of the image renderer is shifted by a fraction of the given pixel. In other words, the light emanating from the given pixel is shifted by sub-pixel amounts.

Optionally, the liquid-crystal structure comprises a plurality of layers of the liquid-crystal medium that are individually and selectively addressable, wherein a given layer is to be selectively addressed to direct light received thereat from the given pixel or from a previous layer towards a given direction. Optionally, in this regard, the plurality of layers are collectively addressable to direct the light to the plurality of positions that lie on the imaginary plane extending across two directions in which the light is to be directed.

Optionally, the display apparatus further comprises a collimator arranged between the image renderer and the liquid-crystal structure. The collimator minimizes spreading of light emanating from each pixel of the image renderer, thereby minimizing blending (or overlap) of light emanating from one pixel of the image renderer with light emanating from another pixel of the image renderer. The collimator may be implemented as a perforated plate, a lenticular array, an array of nanotubes (wherein each nanotube of the array collimates light emanating from a single pixel of the image renderer), a fiber optic plate, or similar.

The at least one processor controls overall operation of the display apparatus. In particular, the at least one processor is coupled to and controls operation of the image renderer and the liquid-crystal device (and specifically, the control circuit of the liquid-crystal device). The at least one processor is also coupled to the gaze-tracking means. The at least one processor may be understood to be a compositor (namely, a processing unit that is configured to perform at least compositing tasks pertaining to presentation of the XR environment). The compositor is a software module taking various inputs (such as the gaze-tracking data from the gaze-tracking means) and composing (namely, building or generating) the output image frames to be displayed via the image renderer. The at least one processor generates the sequence of output image frames. In an embodiment, the sequence of output image frames is generated by a rendering application that is executed by a rendering server, a processor of the HMD, or the computer coupled to the HMD.

Throughout the present disclosure, the term "gaze direction" refers to a direction in which the user's eye is gazing. The gaze direction may be represented by a gaze vector. Optionally, when processing the gaze-tracking data, the at least one processor is configured to employ at least one of: an image processing algorithm, a feature extraction algorithm, a data processing algorithm. Other suitable algorithm(s) can also be employed. It will be appreciated that the gaze direction is determined with respect to a perspective of the user's eye. In other words, a gaze direction of a left eye of the user and a gaze direction of a right eye of the user are determined with respect to perspectives of the user's left eye and right eye, respectively.

Throughout the present disclosure, the term "gaze point" refers to a point on the image plane whereat the gaze direction of the user's eye is directed (namely, focused), when the user views a given output image frame. Optionally, the gaze point is determined by mapping the gaze direction of the user's eye to a corresponding location on the image plane of the image-rendering surface. This gaze point lies in a region of interest (that is a fixation region) within the given output image frame. The region of interest is a region of focus of the user's gaze within the given output image frame. The region of interest is perceived with high visual acuity by foveas of the user's eyes, and is resolved to a much greater detail as compared to the remaining region(s) of the given output image frame.

It will be appreciated that a gaze point for the left eye and a gaze point for the right eye are determined based on the gaze direction of the left eye and the gaze direction of the right eye, respectively. These gaze points on the image plane could be determined based on an intersection of the gaze directions of the left and right eyes. Throughout the present disclosure, the term "image plane" refers to a given imaginary plane on which the given output image frame is visible to the user.

The at least one processor displays the first output image frame via the image renderer, at a first instant of time. For displaying the first output image frame, each colour component of each pixel in the first output image frame is assigned a corresponding first output value.

A given "output value" of the given colour component of the given pixel in a given output image frame is indicative of brightness of the given colour component of the given pixel, for displaying the given output image frame. An "initial given output value" of the given colour component of the given pixel in the given output image frame is indicative of an initial brightness of the given colour component of the given pixel, wherein the given output image frame is to be displayed. The initial given output value may or may not be updated before displaying. Optionally, the at least one processor employs at least one mathematical formula to compute the difference between the first output value and the initial second output value.

The first threshold difference may be either system defined, or user defined. The first threshold difference may be configurable (namely, adjustable) to suit specific image renderer characteristics and viewing conditions. Optionally, the first threshold difference lies within a range of 0 to 0.5. As an example, the first threshold difference may be from 0.0, 0.05, 0.1, 0.15, 0.2, 0.25, 0.3, 0.35, 0.4 or 0.45 up to 0.05, 0.1, 0.15, 0.2, 0.25, 0.3, 0.35, 0.4, 0.45 or 0.5. This range of the first threshold difference may be employed when the given output value and/or the initial given output value of the given colour component of the given pixel lies in the range of 0 to 1.

It will be appreciated that the at least one processor is configured to compare the magnitude of the difference between the first output value and the initial second output value with the first threshold difference to detect whether or not the magnitude of the difference exceeds the first threshold difference. An absolute value of the magnitude of the difference would be utilized when comparing the magnitude of the difference with the first threshold difference. A sign of the difference is not utilized during such comparing. When it is detected that the magnitude of the difference exceeds the first threshold difference, it indicates that the given pixel has considerable contrast difference, and that the initial second output value requires updating. Therefore, the initial second output value is updated to a second output value. Mathematically, in such a case, Second output value=First output value+(Distance factor* (Initial second output value−First output value))

When applying the distance factor to the difference between the first output value and the initial second output value, a sign of the difference stays the same (assuming that the distance factor is non-negative), so when a modulated difference (i.e. distance factor*the difference between the first output value and the initial second output value) is applied to the first output value, a direction of change in output values stays the same.

Optionally, the distance factor decreases with an increase in the distance. In other words, the distance factor is inversely related to the distance of the given pixel from the gaze point on the image plane. Optionally, the function is selected, by the at least one processor, in a manner that upon updating the initial second output value using the distance factor, a difference between the second output value and the first output value of the given colour component (that is greater than or equal to the first threshold difference) is:

amplified for pixels within the region of interest around the gaze point in the second output image frame, and
attenuated (progressively) for pixels outside the region of interest in the second output image frame.

In this regard, amplification of the difference between the second output value and the first output value of the given colour component for the pixels within the region of interest would provide an effect that is similar to liquid crystal device overdrive (namely, a response time compensation) within the region of interest. The initial second output value would be updated to the second output value which corresponds to more change in brightness of the given colour component from the first output value than actually intended. In other words, the second output value to which the initial second output value is updated, is greater than an intended second output value for displaying. Then, as response time of the liquid crystal device is considerably high (namely, is slow), an actual second output value of the given colour component matches the intended second output value of the given colour component. Beneficially, this prevents ghosting effects and increases color reproduction capabilities in the image renderer at an expense of flickering within the region of interest. As the foveas of the user's eyes are quite insensitive to flicker, this would not cause any degradation in viewing quality of the XR environment.

Furthermore, attenuation of the difference between the second output value and the first output value of the given colour component for the pixels outside the region of interest would provide an effect that is similar to a liquid crystal device underdrive in a peripheral region that is outside the region of interest. In simpler terms, (high-contrast) differences between the second output value and the first output value of pixels in the peripheral region are damped towards their average. This prevents flickering in the peripheral region, where the user's eye is especially sensitive to the flickering, at the expense of losing extra apparent resolution provided by shifting the light emanating from the given pixel of the image renderer to the plurality of positions.

It will be appreciated that the selection of the function (of the distance factor) is done such that outside of the region of interest of the user's eye, the at least one processor is able to effectively switch from accentuating contrast differences in output values (which is done for the pixels within the region of interest) to damping them instead, so that there isn't that much flickering in the peripheral region. In the display apparatus, colour reproduction in output image frames is well-adapted to vary according to the gaze location.

Optionally, the distance is measured in degrees as an angular distance between the given pixel and the gaze point, wherein the distance factor has a value that lies in a range of 1-5 for the angular distance that lies in a range of 0-30 degrees. More optionally, the distance factor has a value greater than 1 (for example, a value that lies in a range of 1-3) for the angular distance that lies in a range of 0-15 degrees. Yet more optionally, the distance factor has a value greater than 1 (for example, a value that lies in a range of 1-1.7) for the angular distance that lies in a range of 0-5 degrees. Herein, the term "angular distance" refers to an angular separation between the given pixel and the gaze point that is expressed in terms of angles (such as in units of degrees or radians). In an example, the distance factor may be from 1, 1.5, 2, 2.5, 3, 3.5, 4 or 4.5 up to 1.5, 2, 2.5, 3, 3.5, 4, 4.5 or 5 for the angular distance that may be from 0, 5, 10, 15, 20 or 25 degrees up to 5, 10, 15, 20, 25 or 30 degrees.

Optionally, the distance is measured in pixels, wherein the distance factor has a value that lies in a range of 1-5 for the distance that lies in a range of 1 pixel to 1800 pixels. More optionally, the distance factor has a value greater than 1 (for example, a value that lies in a range of 1-3) for the distance that lies in a range of 1 pixel to 900 pixels. Yet more optionally, the distance factor has a value greater than 1 (for example, a value that lies in a range of 1-1.7) for the distance that lies in a range of 1 pixel to 300 pixels. Herein, the pixels may be "physical pixels" of the image renderer, or "logical pixels" of framebuffer data, and measurement of the distance in either of the physical pixels or the logical pixels only affects a scale in which the distance factor is used. In an example, the distance factor may be from 1, 1.5, 2, 2.5, 3, 3.5, 4 or 4.5 up to 1.5, 2, 2.5, 3, 3.5, 4, 4.5 or 5 for the distance that may be from 1, 100, 200, 300, 400, 500, 600, 700, 800, 900, 1000, 1200, 1300, 1400, 1500, 1600 or 1700 pixels up to 100, 200, 300, 400, 500, 600, 700, 800, 900, 1000, 1200, 1300, 1400, 1500, 1600, 1700 or 1800 pixels.

Optionally, the distance measured in pixels depends on a pixel density of the image renderer. In an example, the pixel density may be 60 pixels per degree (PPD) and the angular distance between the given pixel and the gaze point may be 30 degrees. In such a case, the distance between the given pixel and the gaze point (when measured in pixels) is 1800 pixels (calculated as 60*30 pixels=1800 pixels).

As an example, the distance factor may be represented by a function $F(r)=D+smoothstep(A, B, r)*0$, wherein D refers to a minimum value of the function $F(r)$ outside the region of interest;

smoothstep(A, B, r) refers to a function that returns a value equal to 0 when r is greater than A (or when r>A), and returns a value equal to 1 when r is lesser than B (or when r<B);

A refers to an outer diameter (measured in pixels);

B refers to an inner diameter (measured in pixels);

r refers to the distance of the given pixel from the gaze point on the image plane (measured in pixels); and refers to a multiplier term for a value of the function $F(r)$.

Herein, for the given pixel, when r>A (for example, when r may be 700 pixels and A may be 600 pixels), a value (which is a minimum value) of the function $F(r)$ equals to D, and when r<B (for example, when r may be 200 pixels and B may be 300 pixels), a value (which is a maximum value) of the function $F(r)$ equals to O+D. Optionally, the at least one processor employs a Hermite interpolation for values of r that lie between A and B. An exemplary pseudocode for the distance factor may be:

float smoothstep(float a, float b, float x)
{
float t=saturate((x−a)/(b−a));
return t*t*(3.0−(2.0*t));
}.

It will be appreciated that optionally the second output value (to which the initial second output value is updated) lies in a range of 0 to 1. When a sign of the difference between the first output value and the initial second output value is negative, and resultantly the second output value is a negative value, this negative value is approximated to zero.

In an example, the first output value of the given colour component of the given pixel in the first output image frame may be 0.2, the initial second output value of the given colour component of the given pixel in the second output image frame may be 0.5, the first threshold difference may be 0.15, and the distance factor may be 1.5. Herein, the magnitude of the difference between the first output value and the initial second output value is 0.3 (calculated as |0.5−0.2|=0.3) which exceeds the first threshold difference. In such a case, the initial second output value in the second output image frame is updated to 0.65 (calculated as 0.2+(1.5*0.3)=0.65). Therefore, 0.65 is the second output value.

In another example, the first output value of the given colour component of the given pixel in the first output image frame may be 0.5, the initial second output value of the given colour component of the given pixel in the second output image frame may be 0.1, the first threshold difference may be 0.15, and the distance factor may be 1.5. Herein, the magnitude of the difference between the first output value and the initial second output value is 0.4 (calculated as 10.1-0.51=0.4) which exceeds the first threshold difference. In such a case, the initial second output value in the second output image frame is updated to 0 (calculated as 0.5+(1.5*(−0.4))=−0.1), wherein the negative value is approximated to zero. Here, 0 is the second output value.

Optionally, the distance factor has a value that lies in the range of 0-1. For example, the distance factor may be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1.

In an embodiment, different distance factors are to be employed for different colour components of the given pixel. Optionally, in this regard, the different distance factors are selected based on human eye sensitivity to the different colour components. Typically, human eye sensitivity to the different colour components is different. As an example, the user's eye is most sensitive a green colour component, lesser sensitive to a red colour component, and least sensitive to a blue colour component. In such an example, three different distance factors may be optionally employed for the green, red, and blue colour components of the given pixel. In another embodiment, a single distance factor is employed for different colour components of the given pixel.

The at least one processor displays the second output image frame via the image renderer, at a second instant of time. For displaying the second output image frame, each colour component of each pixel in the second output image frame is assigned a corresponding second output value.

Whilst displaying a given output image frame, the liquid-crystal structure is controlled by the at least one processor (via a requisite drive signal) to shift light through itself according to a requisite shifting sequence and a number of positions in the plurality of positions. The shift in the light emanating from the given pixel of the image renderer to the plurality of positions causes the resolution of output image frames to appear higher than the display resolution of the image renderer. Given that the light emanating from the given pixel is shifted to X positions in a sequential and repeated manner, X output image frames (that are displayed via the image renderer) would be shown to the user at their corresponding X positions, X being equal to or greater than 2. The user is unable to discern the shift of the given pixel and perceives a unified view of the X output image frames having a resolution that is higher than the display resolution. As an example, the light emanating from the given pixel of the image renderer may be shifted to four positions in the sequential and repeated manner. This causes the resolution of the output image frames to appear four times higher than the display resolution.

Optionally, the at least one processor is configured to determine output values of colour components of the given pixel in a plurality of output image frames, based on a shifting sequence in which the light emanating from the given pixel is to be shifted to the plurality of positions. The output values of colour components of the given pixel depend on a position to which the given pixel is to be shifted during display of the plurality of output image frames (namely the position at which the given pixel will be made visible to the user). Therefore, the at least one processor is required to know the shifting sequence in which the light emanating from the given pixel is to be shifted to the plurality of positions. In simple terms, the same physical pixel of the image renderer is utilized to display X different 'virtual pixels' in X consecutive output image frames, based on the shifting sequence in which light emanating from the given pixel is to be shifted to X positions, X being equal to or greater than 2. It will be appreciated that the output values of colour components of the given pixel collectively define a pixel value of the given pixel.

Optionally, when it is detected that the magnitude of the difference between the first output value and the initial second output value does not exceed the first threshold difference, the at least one processor does not update the initial second output value in the second output image frame. This situation occurs when said difference is equal to or lesser than the first threshold difference. In such a case, the initial second output value of the given colour component of the given pixel is utilized (without updating) as the second output value in the second output image frame.

Optionally, the at least one processor is configured to:
quantize the initial second output value of the given colour component of the given pixel by dividing the initial second output value with a quantization factor, to generate an intermediate second output value of the given colour component; and
add a given noise-signal value to the intermediate second output value to generate a given output value of the given colour component.

In this regard, the initial second output value to be quantized may be un-updated or updated, as described previously. It will be appreciated that in order to increase perceived colour depths and/or colour reproduction capabilities in the image renderer, the at least one processor optionally performs dithering for each colour component of pixels within output image frames. Said dithering typically provides an accurate colour reproduction at an expense of temporal resolution, but as the display apparatus already employs pixel-shifting technology that improves spatial resolution at the expense of temporal resolution, said dithering essentially becomes computationally free for use. The term "dithering" refers to a process of intentionally adding the given noise-signal value (that is temporally dynamic) to the intermediate value of the given colour component to generate the given value of the given colour component so that a quantization error is randomized.

It will also be appreciated that pixel value calculations are performed at a high accuracy than the image renderer itself can display. For example, the image renderer may be able to display 256 levels of brightness for each color component of the given pixel by using 8 bits per color component of the given pixel for said calculations, but the calculations could be performed using 32-bit floating point numbers per colour component of the given pixel, thereby increasing perceived colour depths and/or colour reproduction capabilities.

Optionally, the initial second output value of the given colour component is represented using 10 bits, and the intermediate second output value of the given colour component is represented using 8 bits. Then, the initial second output value of the given colour component of the given pixel lies in a range of 0 to 1023, and the intermediate second output value of the given colour component of the given pixel lies in a range of 0 to 255. In an example, the initial second output value of the given colour component may be 824, the quantization factor may be equal to 4, and corresponding generated intermediate second output value of the given colour component may be 206.

The term "quantization factor" refers to a factor that is used for quantizing (namely, compressing in a lossy manner) a range of initial second output values of the given colour component into a single intermediate second output value of the given colour component. Referring to the above example, the quantization factor of 4 indicates that a range of four initial second output values can be quantized to generate one intermediate second output value.

It will be appreciated that for a given range of the initial second output values of the given colour component that map to a same intermediate second output value of the given colour component, an effect of adding the noise-signal value would be that initial second output values that are on a higher side of said range are more likely to map to an intermediate second output value one quantization step higher than in a case of non-dithered mapping, and that initial second output values that are on a lower side of said range are more likely to map to an intermediate second output value one quantization step lower than in the case of non-dithered mapping, hence dithering is provided. As the noise-signal value is different for different pixels and/or different image frames, due to the dithering, the user will perceive a high color depth in the output image frames. In the case of non-dithered mapping, the initial second output values (for example, lying in the range of 0-1023) would simply be quantized to generate intermediate second output values (for example, lying in the range of 0-255) that would have been subsequently rounded off. But in such a case, colour depth perception would not have been improved. It will also be appreciated that after its generation, the given value of the given colour component is optionally rounded off, such as to a nearest integer value.

Optionally, the at least one processor is configured to determine the given noise-signal value using a noise generator function or a noise texture lookup, based on pixel coordinates of the given pixel. The term "noise-signal value" refers to a value that represents an amplitude of noise.

Optionally, a given noise texture is a two-dimensional (2D) noise texture. Alternatively, optionally, a given noise texture is a three-dimensional (3D) noise texture. Herein, the term "two-dimensional noise texture" refers to a noise texture having variation of noise in a 2D space, and the term "three-dimensional noise texture" refers to a noise texture having variation of noise in a 3D space. It will be appreciated that different coordinates in the 2D space/3D space represent different noise-signal values. Optionally, the 2D noise texture and the 3D noise texture are smooth and continuous noise fields in the 2D space and the 3D space, respectively. Beneficially, employing the smooth and continuous noise fields (namely, spatially and temporally varying noise fields) enable in preventing formation of undesirable virtual patterns (such as Modified Uniformly Redundant Array (MURA) patterns) in output image frames. When the 3D noise texture is a smooth and continuous noise field, the at least one processor is optionally configured to obtain a plurality of 2D noise textures from the 3D noise texture. This is attributed to the fact that an interpolation between two adjacent 2D noise-texture slices is feasible as there are no sharp (namely, abrupt) changes in the noise-signal values in individual 2D noise textures of the 3D noise texture. In an example implementation, there could be 16 slices of the 2D noise texture in the 3D noise texture. Optionally, the 3D noise texture is generated using a 3D noise generator function.

Optionally, the at least one processor is configured to: obtain information indicative of a head pose of a user; and select the 2D noise texture from amongst a plurality of 2D noise textures based on the head pose of the user. Optionally, the at least one processor is configured to obtain the information indicative of the head pose of the user from pose-tracking means. The pose-tracking means could be implemented as an internal component of the HMD, as a tracking system external to the HMD, or as a combination thereof. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU).

In an embodiment, the noise generator function is a value noise function. In another embodiment, the noise generator function is a gradient noise function. Examples of the noise generator function may include, but are not limited to, a blue noise function, a white noise function, a Perlin noise function, a Gaussian noise function, a simplex noise function, a diamond-square algorithm, a simplified value noise function based on prime number offsets, a random noise generator function, an algorithmic noise generator function. Optionally, when the noise generator function is the random noise generator function, the at least one processor is configured to employ the random noise generator function to select a random number as the given noise-signal value. The random number may, for example, lie in a range of: −0.3 to 0.3, −0.5 to 0.5, −0.7 to 0.7 or similar. It will be appreciated that optionally the given noise-signal value is adjusted, by the at least one processor, based on a user feedback.

Optionally, when determining the given noise-signal value, the at least one processor is configured to map the pixel coordinates of the given pixel to a corresponding noise-signal value generated using the noise generator function or the noise texture lookup. Noise-signal values for pixels having different pixel coordinates may be different. Optionally, lookup table(s) may be employed for determining pixel coordinate-specific noise-signal values for various pixels. Optionally, the at least one processor is configured to determine the given noise-signal value using the noise generator function or the noise texture lookup, based also on time, when the noise generator function or the noise texture is time-variant. It will be appreciated that noise generation methods other than the noise generator function or the noise texture lookup can also be employed in the display apparatus.

Optionally, the at least one processor is configured to process an input sequence of input image frames to generate an output sequence of output image frames, wherein a number of input image frames in the input sequence and a number of output image frames in the output sequence are equal to a number of positions in the plurality of positions, and wherein a number of pixels in a given input image frame is equal to a product of a number of pixels in a given output image frame and the number of positions, wherein, when generating the output image frames, the at least one processor is configured to:
  determine, based on the gaze point on the image plane, at least a first input region and a second input region within each input image frame, wherein the first input region includes and surrounds the gaze point, and the second input region surrounds the first input region;
  divide each input image frame into a plurality of groups of neighbouring input pixels based on a shifting sequence in which the light emanating from the given pixel is to be shifted to the plurality of positions, wherein a number of input pixels in a given group of neighbouring input pixels is equal to the number of positions in the plurality of positions; and
  generate, from an $N^{th}$ input pixel in a given group of neighbouring input pixels within a first input region of an $N^{th}$ input image frame in the input sequence, a corresponding pixel for a first output region of an $N^{th}$ output image frame in the output sequence.

Throughout the present disclosure, the term "input image frame" refers to an image frame that serves as an input for generating a corresponding output image frame. The sequence of input image frames is not shown to the user, whereas the sequence of output image frames is shown to the user. The number of pixels in the given input image frame is greater than the number of pixels in the given output image frame, as for each pixel of the given output image frame, the given input image frame includes multiple pixels (equivalent to the number of positions in the plurality of positions) that are to be utilized one by one for generating the given pixel in multiple output image frames. Framebuffer data for generating the output image frames is readily available and is equal to N times the display resolution of the image renderer, N being the number of positions in the plurality of positions). In other words, the framebuffer data (that includes input values of colour components of all input pixels in input image frames) has a logical resolution that is equal to N times the display resolution of the image renderer. At any given time, only 1/N input pixels of the given input image frame are utilized to generate corresponding pixels of the given output image frame.

Optionally, a shape of the first input region is one of: a polygon, a circle, an ellipse, a freeform shape. It will be appreciated that there may optionally be determined additional input regions (such as a third input region, a fourth input region, and so forth) within each input image frame. Such additional input regions may optionally lie between the first input region and the second input region.

Throughout the present disclosure, the term "shifting sequence" refers to a time-based order in which the light emanating from the given pixel is to be shifted to the plurality of positions. The shifting sequence may be a raster scanning sequence, a random sequence, a Halton sequence (for example, 256 or 1024 first locations of Halton (2, 3)), or similar. It will be appreciated that various shifting sequences may be feasible for shifting the light emanating from the given pixel to the plurality of positions.

It will be appreciated that a shape of the area of the image renderer that includes the plurality of positions could be polygonal (for example, rectangular, square, hexagonal, and the like), circular, elliptical, freeform, and the like. It will also be appreciated that said area is defined based on a sub-pixel scheme and spacing between the pixels and/or between the sub-pixels. Optionally, the plurality of positions of the given pixel form: a polygonal arrangement, a circular arrangement, an elliptical arrangement, a freeform arrangement. Optionally, when dividing each input image frame into the plurality of groups of neighbouring input pixels, the input pixels to be included in the given group are determined based on the shifting sequence.

In an example, there may be four positions P1, P2, P3, and P4 (arranged as a 2*2 grid) in the plurality of positions. Then, the number of input image frames in the input sequence and the number of output image frames would be equal to four. Let us consider, for example, that the number of pixels in each output frame is equal to 16 and therefore, the number of pixels in each input frame would be 64. Herein, each input image frame would be divided into 16 groups of neighbouring input pixels, wherein the number of input pixels in each of the 16 groups is equal to four pixels. Based on the gaze point on the image plane, the first input region of the $N^{th}$ input image frame may be identified as a top-left region of the $N^{th}$ input image frame, while the second input region of the $N^{th}$ input image frame may be identified as a remaining region of the $N^{th}$ input image frame. For example, the first input region includes two groups of neighbouring input pixels from amongst the 16 groups, whereas the second input region includes 14 groups of neighbouring input pixels from amongst the 16 groups. Let us consider that $1^{st}$, $2^{nd}$, $3^{rd}$ and $4^{th}$ input pixels in a given group of neighbouring pixels within a first input region of a given input image frame are represented as:

aN|bN
---|---
dN|cN

Herein, the at least one processor may be configured to generate: from a $1^{st}$ input pixel (a1) in the given group of a $1^{st}$ input image frame, a corresponding pixel (that is to be shifted to the position P1) for a first output region of a $1^{st}$ output image frame; from a $2^{nd}$ input pixel (b2) in the given group of a $2^{nd}$ input image frame, a corresponding pixel (that is to be shifted to the position P2) for a first output region of a $2^{nd}$ output image frame; from a $3^{rd}$ input pixel (c3) in the given group of a $3^{rd}$ input image frame, a corresponding pixel (that is to be shifted to the position P3) for a first output region of a $3^{rd}$ output image frame; and from a $4^{th}$ input pixel (d4) in the given group of a $4^{th}$ input image frame, a corresponding pixel (that is to be shifted to the position P4) for a first output region of a $4^{th}$ output image frame. It will be appreciated that the above example is for illustration purposes only, and various other examples with different values of the number of positions in the plurality of positions, different values of the number of pixels in the given output image frame, different gaze points, and the like, are also feasible.

Optionally, when generating the output image frames, the at least one processor is configured to combine input pixels in a given group of neighbouring input pixels within a second input region of an $M^{th}$ input image frame in the input sequence to generate a corresponding pixel for a second output region of an $M^{th}$ output image frame in the output sequence. Herein, "combining" refers to an image processing operation wherein pixel values of the input pixels in the given group of neighbouring input pixels within the second input region of the $M^{th}$ input image frame are combined to yield a single resultant pixel value, the single resultant pixel value being associated with a single corresponding pixel for a second output region of the $M^{th}$ output image frame. Therefore, combining operation incorporates visual information associated with the input pixels in the given group of neighbouring input pixels into the corresponding pixel for the second output region of the $M^{th}$ output image frame. Upon such combination, the generated corresponding pixel in the second output region of the $M^{th}$ output image frame is larger in size as compared to a size of an input pixel in the second region of the $M^{th}$ input image frame. As a result of the combining operation, angular resolution of the second output region of the $M^{th}$ output image frame is lower than angular resolution of the second input region of the $M^{th}$ input image frame.

Optionally, when combining the input pixels in the given group of neighbouring input pixels within a second input region of the $M^{th}$ input image frame in the input sequence to generate the corresponding pixel for the second output region of the $M^{th}$ output image frame in the output sequence, the at least one processor is configured to employ at least one of: pixel binning, averaging, weighted averaging, non-linear median filtering, minimum-maximum filtering, interpolation, image scaling (namely, image resizing).

Optionally, the output sequence of output image frames is displayed in a manner that second output regions of the output image frames appear to have a higher frame rate than first output regions of the output image frames. A temporal resolution of the second output regions is higher than a temporal resolution of the first output regions of the output image frames. The apparent frame rate (namely, the temporal resolution) of the second output regions of the output image frames is high (for example, such as 90 frames per second (FPS), 100 FPS, 120 FPS, 180 FPS, 240 FPS, and the like). Resultantly, no flicker or jerk is noticed by the user in the second output regions of the output image frames. Moreover, when the sequence of output image frames is displayed, the user perceives higher visual detail in the first output regions of the output image frames as compared to the second output regions of the output image frames.

Optionally, when generating a given output image frame, the at least one processor is configured to generate output values for the first output region and the second output region in a manner that an angular resolution of the first output region is higher than an angular resolution of the second output region. Herein, the term "angular resolution" of a given output region of a given image frame refers to a number of pixels per degree (also referred to as points per degree (PPD)) in the given region. In other words, angular resolution of the given output region of the given image frame refers to a pixel density in the given output region. Notably, a high angular resolution of the given output region is indicative of a high visual detail of the given output region. The given output image frame optionally has a variable angular resolution. The variable angular resolution of the sequence of output image frames emulates and approximates human-eye resolution and human-eye foveation properties, without requiring use of expensive high-resolution image renderers and additional optical components. The angular resolution of the first output region optionally approximates super-resolution, the super-resolution being provided only in the first output region as foveas of the user's eyes are quite insensitive to flicker that is introduced upon provision of the super-resolution. In the second output region, the super-resolution is not provided since remaining portions of the retinas of the user's eyes are quite sensitive to flicker.

It will be appreciated that the color reproduction capabilities are significantly improved when generating the output image frames based on the gaze direction of users eye. This is attributed to the fact that colour reproduction for different output regions of the output image frames, such as the first output region and the second output region, is performed differently in an optimized manner, using the distance factor.

Optionally, the first output value of the given colour component of the given pixel in the first output image frame is generated from an input value of the given colour component of a first input pixel in a given group of neighbouring input pixels in a first input image frame, wherein the at least one processor is configured to:

detect whether or not an initial difference between the input value of the given colour component of the first input pixel and an input value of the given colour component of a second input pixel in the given group of neighbouring input pixels in the first input image frame lies within a second threshold value from the difference between the first output value and the initial second output value; and when it is detected that the initial difference lies within the second threshold value from the difference between the first output value and the initial second output value, employ the initial second output value of the given colour component of the given pixel in the second output image frame, irrespective of whether or not the magnitude of the difference between the first output value and the initial second output value exceeds the first threshold difference.

As an example, let us consider that $1^{st}$, $2^{nd}$, $3^{rd}$ and $4^{th}$ input pixels in a given group of neighbouring pixels in a given input image frame are represented as:

aN|bN
---|---
dN|cN.

Then, the initial difference between the input value of the given colour component of input pixel a1 and the input value of the given colour component of input pixel b1 is compared with the difference between the first output value and the initial second output value may be expressed as a1−b2. In other words, a contrast difference between a1 and b2 is compared to a contrast difference between a1 and b1 (to determine if these are still the same pixel colors as they were in last image frame). It will be appreciated that during said comparison a sign of the initial difference (i.e. a1−b1) is considered to be significant as the at least one processor is configured to detect whether or not a same difference exists between a previous input image frame and a current input image frame.

The second threshold allows for some leeway when either of colors of the first input pixel or the second input pixel change subtly (due to changes in lighting conditions, or similar) across image frames. The second threshold value may be either system defined, or user defined. The second threshold value may be configurable (namely, adjustable). Optionally, the second threshold value lies within a range of −0.1 to 0.1. As an example, the second threshold value may be from −0.1, −0.09, −0.08, −0.07, −0.06, −0.05, −0.04, −0.03, −0.02, −0.01, 0, 0.01, 0.02, 0.03, 0.04, 0.05, 0.06, 0.07, 0.08 or 0.09 up to −0.09, −0.08, −0.07, −0.06, −0.05, −0.04, −0.03, −0.02, −0.01, 0, 0.01, 0.02, 0.03, 0.04, 0.05, 0.06, 0.07, 0.08, 0.09 or 0.1. Other ranges of the second threshold value are also feasible.

In case of a stationary object (having static edges) being represented in consecutive output image frames, the initial difference lies within the second threshold value from the difference between the first output value and the initial second output value. In such a case, the at least one processor would rely on a built-in liquid crystal device overdrive in order to prevent halo effects such as around lighting areas in the output image frames, and employ (without updating) the initial second output value of the given colour component of the given pixel in the second output image frame. Alternatively, in case of a moving object being represented in the consecutive output image frames, the initial difference is considerable and does not lie within the second threshold value from the difference between the first output value and the initial second output value. In such a case, the at least one processor would not rely on the built-in liquid crystal device overdrive for proper colour reproduction, and the at least one processor will employ an updated initial second output value of the given colour component of the given pixel in the second output image frame in order to provide the effect that is similar to the liquid crystal device overdrive. This prevents occurrence of ghosting artifacts when the moving object is being displayed. The apparent increase to be provided in the resolution of the output image frames also enables in better distinguishing between the stationary object and the moving object, and better adapting for colour reproduction accordingly.

Optionally, when it is detected that the initial difference does not lie within the second threshold value from the difference between the first output value and the initial second output value, the at least one processor is configured to update the initial second output value of the given colour component of the given pixel when the magnitude of the difference between the first output value and the initial second output value exceeds the first threshold difference.

The present disclosure also relates to the method as described above. Various embodiments and variants disclosed above, with respect to the aforementioned first aspect, apply mutatis mutandis to the method.

Optionally, in the method, the distance factor decreases with an increase in the distance.

Optionally, in the method, the distance is measured in degrees as an angular distance between the given pixel and the gaze point, wherein the distance factor has a value that lies in a range of 1-5 for the angular distance that lies in a range of 0-30 degrees.

Optionally, in the method, the distance is measured in pixels, wherein the distance factor has a value that lies in a range of 1-5 for the distance that lies in a range of 1-1800 pixels.

Optionally, in the method, different distance factors are employed for different colour components of the given pixel.

Optionally, the method further comprises:
quantizing the initial second output value of the given colour component of the given pixel by dividing the initial second output value with a quantization factor, to generate an intermediate second output value of the given colour component; and
adding a given noise-signal value to the intermediate second output value to generate a given output value of the given colour component.

Optionally, the method further comprises determining the given noise-signal value using a noise generator function or a noise texture lookup, based on pixel coordinates of the given pixel.

Optionally, the method further comprises processing an input sequence of input image frames to generate an output sequence of output image frames, wherein a number of input image frames in the input sequence and a number of output image frames in the output sequence are equal to a number of positions in the plurality of positions, and wherein a number of pixels in a given input image frame is equal to a product of a number of pixels in a given output image frame and the number of positions, wherein the step of generating the output image frames comprises:
determining, based on the gaze point on the image plane, at least a first input region and a second input region within each input image frame, wherein the first input region includes and surrounds the gaze point, and the second input region surrounds the first input region;
dividing each input image frame into a plurality of groups of neighbouring input pixels based on a shifting sequence in which the light emanating from the given pixel is to be shifted to the plurality of positions, wherein a number of input pixels in a given group of neighbouring input pixels is equal to the number of positions in the plurality of positions; and
generating, from an $N^{th}$ input pixel in a given group of neighbouring input pixels within a first input region of an $N^{th}$ input image frame in the input sequence, a corresponding pixel for a first output region of an $N^{th}$ output image frame in the output sequence.

Optionally, in the method, the step of generating the output image frames further comprises combining input pixels in a given group of neighbouring input pixels within a second input region of an $M^{th}$ input image frame in the input sequence to generate a corresponding pixel for a second output region of an $M^{th}$ output image frame in the output sequence.

Optionally, when the first output value of the given colour component of the given pixel in the first output image frame is generated from an input value of the given colour component of a first input pixel in a given group of neighbouring input pixels in a first input image frame, the method further comprises:
detecting whether or not an initial difference between the input value of the given colour component of the first input pixel and an input value of the given colour component of a second input pixel in the given group of neighbouring input pixels in the first input image frame lies within a second threshold value from the difference between the first output value and the initial second output value; and when it is detected that the initial difference lies within the second threshold value from the difference between the first output value and the initial second output value, employing the initial second output value of the given colour component of the given pixel in the second output image frame, irrespective of whether or not the magnitude of the difference between the first output value and the initial second output value exceeds the first threshold difference.

DETAILED DESCRIPTION OF THE DRAWINGS

Referring to FIG. 1, illustrated is a block diagram of architecture of a display apparatus 100, in accordance with an embodiment of the present disclosure. The display apparatus 100 comprises gaze-tracking means 102, an image renderer per eye (depicted as an image renderer 104 for a first eye and an image renderer 106 for a second eye), a liquid-crystal device per eye (depicted as a liquid-crystal device 108 for the first eye and a liquid-crystal device 110 for the second eye), and at least one processor (depicted as a processor 112). The liquid crystal devices 108 and 110 comprise liquid-crystal structures 114 and 116 and control circuits 118 and 120, respectively. The liquid-crystal structures 114 and 116 are arranged in front of image-rendering surfaces of the image renderers 104 and 106, respectively, wherein the liquid-crystal structures 114 and 116 are electrically controlled, via the control circuits 118 and 120, respectively.

It may be understood by a person skilled in the art that the FIG. 1 includes simplified architecture of display apparatus 100 for sake of clarity, which should not unduly limit the scope of the claims herein. The person skilled in the art will recognize many variations, alternatives, and modifications of embodiments of the present disclosure.

Figure 2:
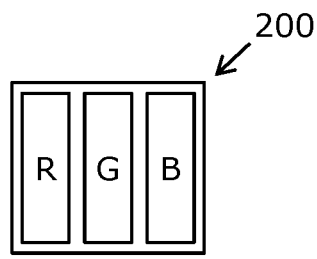
FIG. 2 is a schematic illustration of a given pixel of an image renderer, in accordance with an embodiment of the present disclosure.

Referring to FIG. 2, illustrated is a schematic illustration of a given pixel 200 of an image renderer, in accordance with an embodiment of the present disclosure. The given pixel 200 comprises three colour components (notably, a red colour component depicted as 'R', a green colour component depicted as 'G', and a blue colour component depicted as 'B') that are arranged in a one-dimensional array.

It may be understood by a person skilled in the art that the FIG. 2 includes simplified illustration of a given pixel 200 of the image renderer for sake of clarity, which should not unduly limit the scope of the claims herein. The person skilled in the art will recognize many variations, alternatives, and modifications of embodiments of the present disclosure. In an example, the given pixel may comprise only one colour component. In another example, the given pixel may comprise five colour components (such as two red colour components, two green colour components, and one blue colour component) that are arranged in a PenTile® matrix layout.

Figure 3:
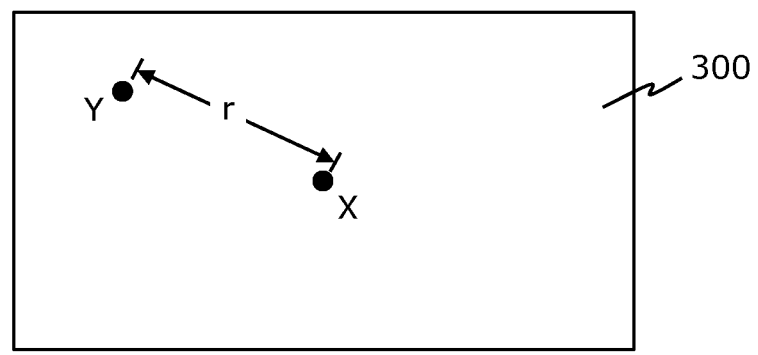
FIG. 3 is a schematic illustration of an image plane of an image-rendering surface at which a user is gazing, in accordance with an embodiment of the present disclosure.

Referring to FIG. 3, illustrated is a schematic illustration of an image plane 300 of an image-rendering surface at which a user is gazing, in accordance with an embodiment of the present disclosure. Herein, a gaze point (depicted as 'X') lies, for example, at a centre of the image plane 300. A distance factor for a given pixel (depicted as 'Y') is a function of a distance (depicted as 'r') of the given pixel Y from the gaze point X on the image plane 300.

Figure 4A:
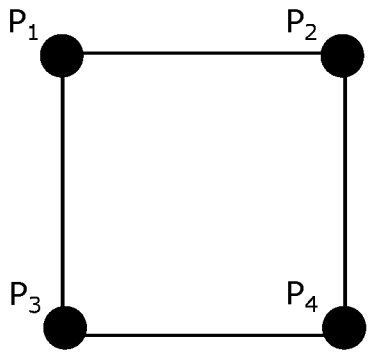
FIGS. 4A and 4B illustrate a plurality of positions to which light emanating from a given pixel of an image renderer is shifted in a sequential and repeated manner, in accordance with different embodiments of the present disclosure.
Figure 4B:
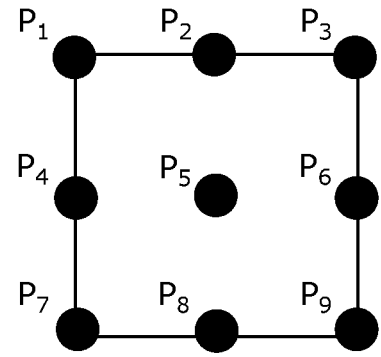

Referring to FIGS. 4A and 4B, illustrated are positions to which light emanating from a given pixel of an image renderer is shifted in a sequential and repeated manner, in accordance with different embodiments of the present disclosure. In FIGS. 4A and 4B, these positions are represented as blackened circles, and a square outline is depicted merely to show an area where the shifting takes place. Such an area can also have any other suitable shape.

In FIG. 4A, the light emanating from the given pixel is shifted to four positions P1, P2, P3, and P4. These four positions P1-P4 form a 2×2 array. In FIG. 4B, the light emanating from the given pixel is shifted to nine positions P1, P2, P3, P4, P5, P6, P7, P8, and P9. These nine positions P1-P9 form a 3×3 array.

It may be understood by a person skilled in the art that the FIGS. 4A and 4B include exemplary positions to which light-shifting takes place for sake of clarity, which should not unduly limit the scope of the claims herein. The person skilled in the art will recognize many variations, alternatives, and modifications of embodiments of the present disclosure. In an example, the light emanating from the given pixel may be shifted to 12 positions. These 12 positions may form a 4×3 array. In another example, the light emanating from the given pixel may be shifted to 9 positions. These 9 positions may form a centered circular arrangement.

Figure 4C:
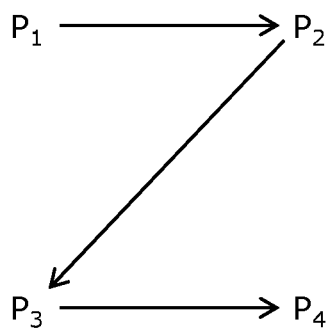
FIGS. 4C and 4D illustrate two exemplary shifting sequences in which the light emanating from the given pixel is to be shifted to four positions of FIG. 4A, in accordance with different embodiments of the present disclosure.
Figure 4E:
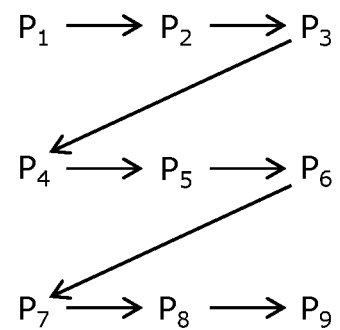
FIGS. 4E and 4F illustrate two exemplary shifting sequences in which the light emanating from the given pixel is to be shifted to nine positions of FIG. 4B, in accordance with different embodiments of the present disclosure.
Figure 4D:
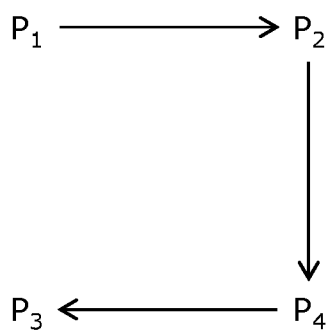

Referring to FIGS. 4C and 4D, illustrated are two exemplary shifting sequences in which the light emanating from the given pixel is to be shifted to four positions P1-P4 of FIG. 4A, in accordance with different embodiments of the present disclosure. An order in which the positions are to be shifted sequentially is indicated by way of arrows. In FIG. 4C, the shifting sequence is: P1, P2, P3, P4. In FIG. 4D, the shifting sequence is: P1, P2, P4, P3.

Figure 4F:
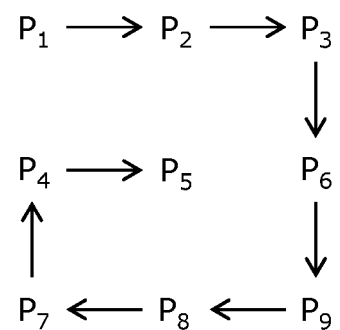

Referring FIGS. 4E and 4F, illustrated are two exemplary shifting sequences in which the light emanating from the given pixel is to be shifted to nine positions of FIG. 4B, in accordance with different embodiments of the present disclosure. An order in which the positions are to be shifted sequentially is indicated by way of arrows. In FIG. 4E, the shifting sequence is: P1, P2, P3, P4, P5, P6, P7, P8, P9. In FIG. 4F, the shifting sequence is: P1, P2, P3, P6, P9, P8, P7, P4, P5.

Figure 5A:
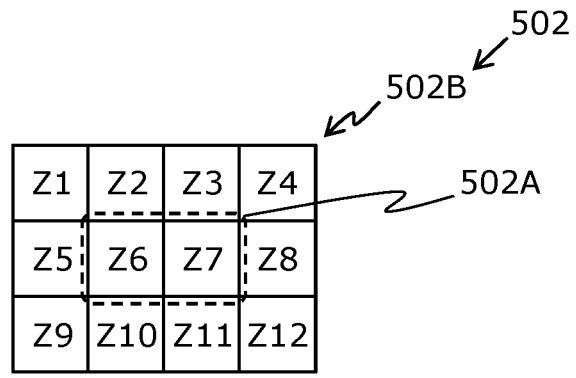
Figure 5B:
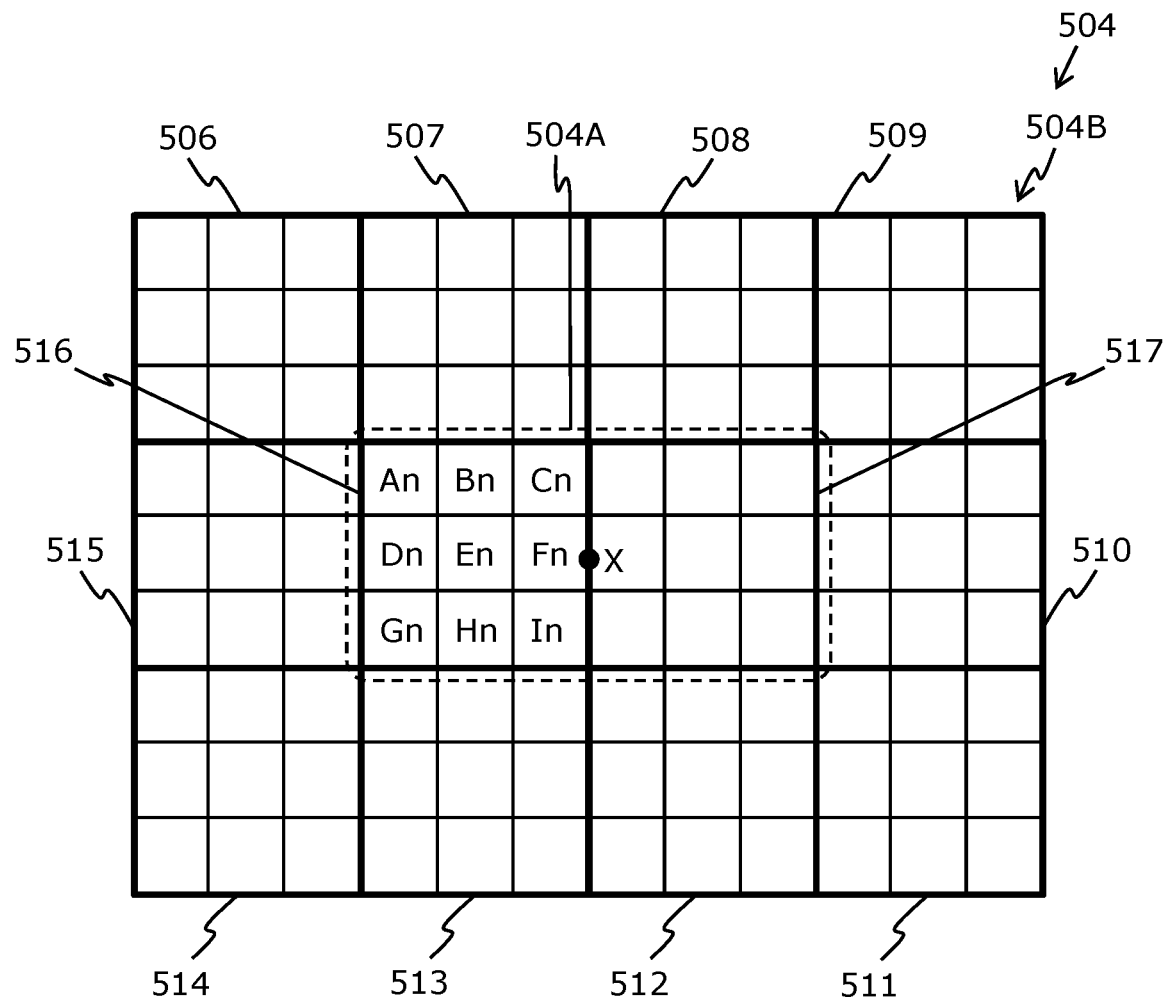
FIG. 5B illustrates a given input image frame, in accordance with an embodiment of the present disclosure.

Referring to FIGS. 5A and 5B, FIG. 5A illustrates a given output image frame 502, while FIG. 5B illustrates a given input image frame 504, in accordance with an embodiment of the present disclosure. The "given output image frame" and "given input image frame" may be understood to be an $N^{th}$ output image frame and an $N^{th}$ input image frame, respectively.

In FIG. 5A, the given output image frame 502 has 12 pixels Z1, Z2, Z3, Z4, Z5, Z6, Z7, Z8, Z9, Z10, Z11, and Z12. Herein, the given output image frame 502 comprises a first output region 502A, and a second output region 502B, wherein the pixels Z6 and Z7 belong to the first output region 502A, while the pixels Z1, Z2, Z3, Z4, Z5, Z8, Z9, Z10, Z11, and Z12 belong to the second output region 502B.

In FIG. 5B, a gaze point 'X' lies, for example, at a centre of an image plane of an image-rendering surface at which a user is gazing. The given input image frame 504 comprises a first input region 504A, and a second input region 504B, wherein the first input region 504A includes and surrounds the gaze point X, and the second input region 504B surrounds the first input region 504A.

A number of pixels in the given input image frame 504 is equal to 108 (as 12*9=108 (a product of a number of output pixels in the given output image frame and the number of positions)). The given input image frame 504 is shown to be divided into 12 groups 506, 507, 508, 509, 510, 511, 512, 513, 514, 515, 516 and 517 of neighbouring input pixels, wherein each group comprises nine input pixels (as number of positions is equal to nine). The groups 516 and 517 of the neighbouring input pixels belong to the first input region 504A, and the groups 506-515 of the neighbouring input pixels belong to the second input region 504B.

Let us consider, for example, that light emanating from a given pixel (from amongst the 12 pixels Z1-Z 12) is to be shifted to nine positions P1, P2, P3, P4, P5, P6, P7, P8, and P9 (of FIG. 4B) in a shifting sequence: P1, P2, P3, P4, P5, P6, P7, P8, P9 (as depicted in FIG. 4E). The nine positions P1, P2, P3, P4, P5, P6, P7, P8, and P9 correspond to nine instants of time T1, T2, T3, T4, T5, T6, T7, T8, and T9, respectively, during displaying of the given pixel. A given output value of colour components of the given pixel in the given output image frame 502 depends on these nine positions P1-P9 to which the given pixel is to be shifted during display of the given output image frame. At least one processor (not shown) is configured to process nine input image frames to generate nine output image frames, wherein one input image frame is processed to generate one output image frame corresponding to a specific position from amongst the positions P1-P9. The group 516 is shown to comprise nine input pixels An, Bn, Cn, Dn, En, Fn, Gn, Hn, and In, wherein value of 'n' is 1, 2, 3, 4, 5, 6, 7, 8, and 9 for the nine input image frames. As example, in a first input image frame, the group 516 comprises the nine input pixels A1, B1, C1, D1, E1, F1, G1, H1, and in a second input image frame, the group 516 comprises the nine input pixels A2, B2, C2, D2, E2, F2, G2, H2, and I2; and so on.

The at least one processor is configured to generate, from a given input pixel in the group 516 within the first input region 504A of the given input image frame, the pixel Z6 for the first output region 502A of the given output image frame. In an example, the input pixel A1 of the first input image frame, the input pixel B2 of the second input image frame, input pixel C3 of a third input image frame, input pixel D4 of a fourth input image frame, input pixel E5 of a fifth input image frame, input pixel F6 of a sixth input image frame, input pixel G7 of a seventh input image frame, input pixel H8 of a eighth input image frame, and input pixel 19 of a ninth input image frame are used to generate the pixel Z6 of a first output image frame, a second output image frame, a third output image frame, a fourth output image frame, a fifth output image frame, a sixth output image frame, a seventh output image frame, an eighth output image frame, and a ninth output image frame, corresponding to the instants of time T1, T2, T3, T4, T5, T6, T7, T8, and T9, respectively. Notably, all pixels in the first output region 502A of the nth output image frame 502 are generated in a similar way. In an example, the pixel Z7 is also generated in a similar manner as the pixel Z6.

Moreover, the at least one processor is configured to combine nine input pixels in the group 506 within the second input region 504B of the given input image frame 504 to generate the pixel Z1 for the second output region 502B of the given output image frame 502. Referring to the above example, a combination of nine input pixels of the group 506 of the first input image frame, the second input image frame, the third input image frame, the fourth input image frame, the fifth input image frame, the sixth input image frame, the seventh input image frame, the eighth input image frame, and the ninth input image frame, is used to generate the pixel Z1 of the first output image frame, the second output image frame, the third output image frame, the fourth output image frame, the fifth output image frame, the sixth output image frame, the seventh output image frame, the eighth output image frame, and the ninth output image frame, corresponding to the instants of time T1, T2, T3, T4, T5, T6, T7, T8, and T9, respectively. Notably, all pixels in the second output region 502A of the nth output image frame 502 are generated in a similar way. In an example, the pixels Z2, Z3, Z4, Z5, Z8, Z9, Z10, Z11, and Z12 are also generated in a similar manner as the pixel Z1.

Figure 6A:
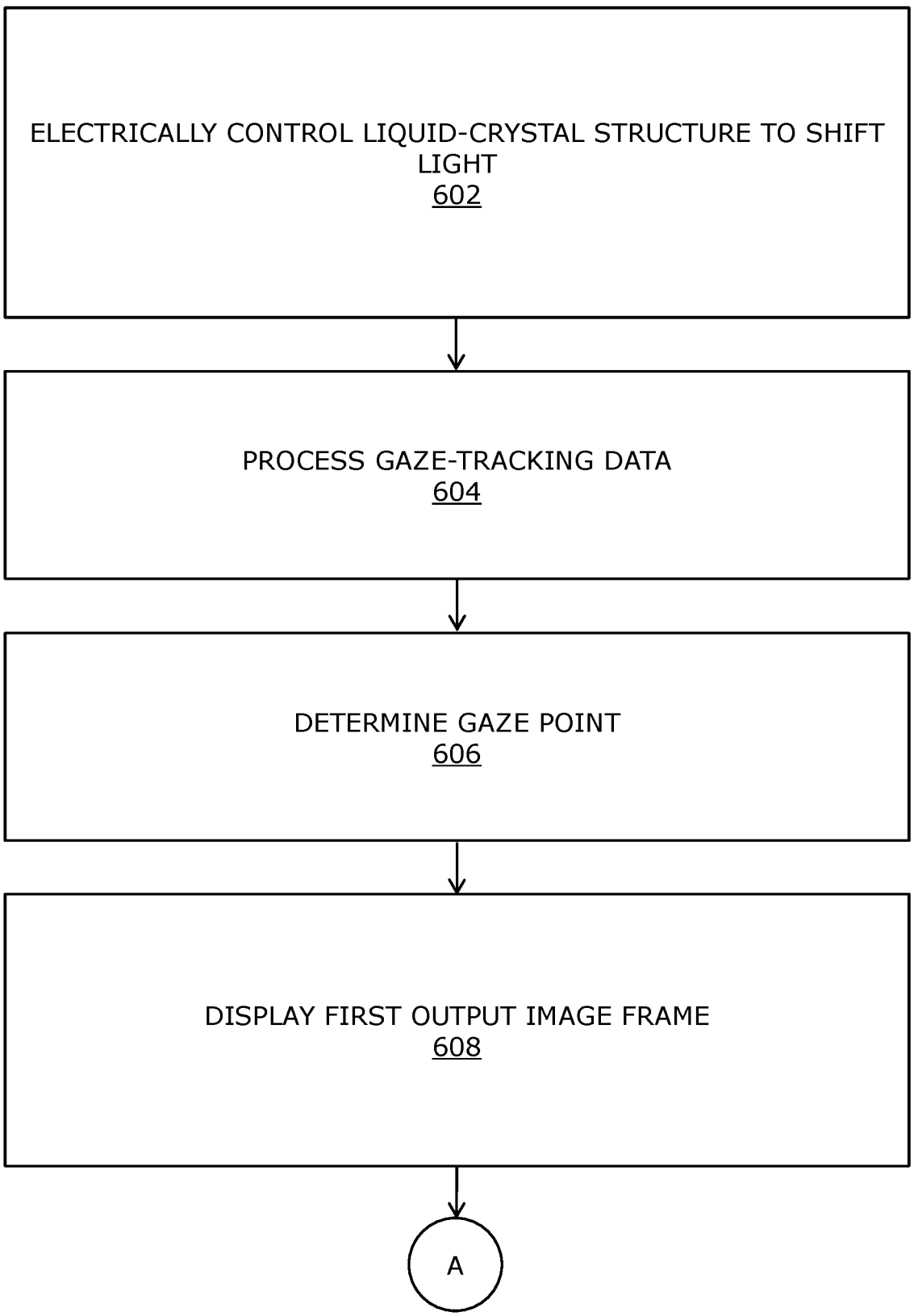
FIGS. 6A and 6B illustrate steps of a method of displaying via a display apparatus, in accordance with an embodiment of the present disclosure.
Figure 6B:
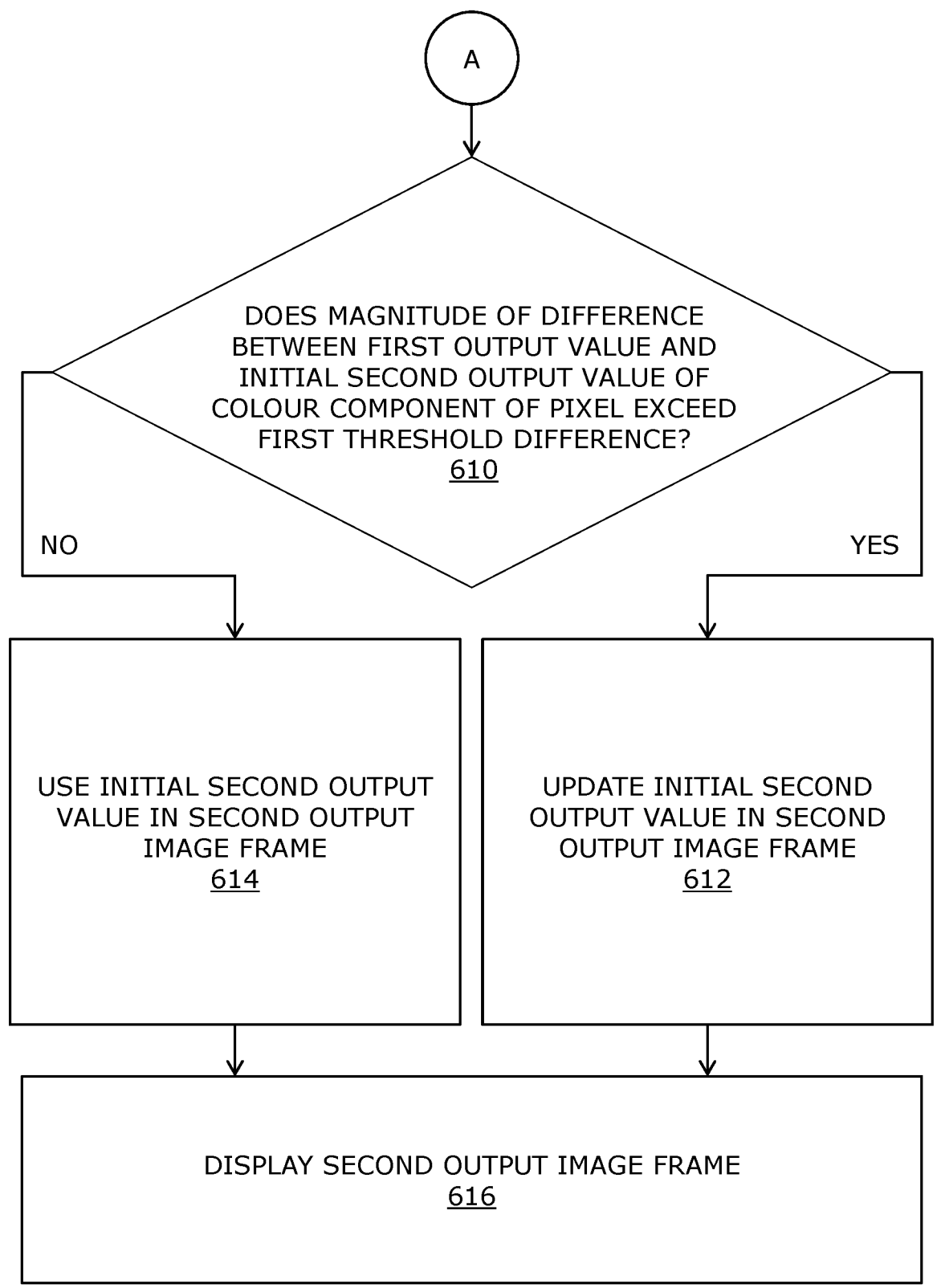

Referring to FIG. 6 illustrated are steps of a method of displaying via a display apparatus, in accordance with an embodiment of the present disclosure. The display apparatus comprises gaze-tracking means, an image renderer per eye, and a liquid-crystal device comprising a liquid-crystal structure and a control circuit, wherein the liquid-crystal structure is arranged in front of an image-rendering surface of the image renderer. At step 602, the liquid-crystal structure is electrically controlled, via the control circuit, to shift light emanating from a given pixel of the image renderer to a plurality of positions in a sequential and repeated manner, the given pixel comprising at least one colour component. At step 604, gaze-tracking data, collected by the gaze-tracking means, is processed to determine a gaze direction of a user's eye. At step 606, a gaze point is determined on an image plane of the image-rendering surface at which the user is gazing, based on the gaze direction of the user's eye. At step 608, a first output image frame is displayed via the image renderer. At step 610, it is detected whether or not a magnitude of a difference between a first output value of a given colour component of the given pixel in the first output image frame and an initial second output value of the given colour component of the given pixel in a second output image frame exceeds a first threshold difference, wherein the second output image frame is to be displayed subsequent to the first output image frame. When it is detected that the magnitude of the difference between the first output value and the initial second output value exceeds the first threshold difference, at step 612, the initial second value in the second output image frame is updated to a sum of the first output value and a product of a distance factor and a difference between the initial second output value and the first output value, wherein the distance factor is a function of a distance of the given pixel from the gaze point on the image plane. Otherwise, when it is detected that the magnitude of the difference between the first output value and the initial second output value does not exceed the first threshold difference, at step 614, the initial second value in the second output image frame is not updated, and this non-updated initial second value is used in the second output image frame. At step 616, the second output image frame is displayed via the image renderer.

The steps 602, 604, 606, 608, 610, 612, 614, and 616 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display apparatus comprising:
gaze-tracking means;
an image renderer per eye;
a liquid-crystal device comprising a liquid-crystal structure and a control circuit, wherein the liquid-crystal structure is arranged in front of an image-rendering surface of the image renderer, wherein the liquid-crystal structure is to be electrically controlled, via the control circuit, to shift light emanating from a given pixel of the image renderer to a plurality of positions in a sequential and repeated manner, the given pixel comprising at least one colour component; and
at least one processor configured to:
process gaze-tracking data, collected by the gaze-tracking means, to determine a gaze direction of a user's eye;
determine, based on the gaze direction of the user's eye, a gaze point on an image plane of the image-rendering surface at which the user is gazing;
display a first output image frame via the image renderer;
detect whether or not a magnitude of a difference between a first output value of a given colour component of the given pixel in the first output image frame and an initial second output value of the given colour component of the given pixel in a second output image frame exceeds a first threshold difference, wherein the second output image frame is to be displayed subsequent to the first output image frame;
when it is detected that the magnitude of the difference between the first output value and the initial second output value exceeds the first threshold difference, update the initial second output value in the second output image frame to a sum of the first output value and a product of a distance factor and a difference between the initial second output value and the first output value, wherein the distance factor is a function of a distance of the given pixel from the gaze point on the image plane; and
display the second output image frame via the image renderer.

2. The display apparatus of claim 1, wherein the distance factor decreases with an increase in the distance.

3. The display apparatus claim 1, wherein the distance is measured in degrees as an angular distance between the given pixel and the gaze point, wherein the distance factor has a value that lies in a range of 1-5 for the angular distance that lies in a range of 0-30 degrees.

4. The display apparatus of claim 1, wherein the distance is measured in pixels, wherein the distance factor has a value that lies in a range of 1-5 for the distance that lies in a range of 1-1800 pixels.

5. The display apparatus of claim 1, wherein different distance factors are to be employed for different colour components of the given pixel.

6. The display apparatus of claim 1, wherein the at least one processor is configured to:
quantize the initial second output value of the given colour component of the given pixel by dividing the initial second output value with a quantization factor, to generate an intermediate second output value of the given colour component; and
add a given noise-signal value to the intermediate second output value to generate a given output value of the given colour component.

7. The display apparatus of claim 6, wherein the at least one processor is configured to determine the given noise-signal value using a noise generator function or a noise texture lookup, based on pixel coordinates of the given pixel.

8. The display apparatus of claim 1, wherein the at least one processor is configured to process an input sequence of input image frames to generate an output sequence of output image frames, wherein a number of input image frames in the input sequence and a number of output image frames in the output sequence are equal to a number of positions in the plurality of positions, and wherein a number of pixels in a given input image frame is equal to a product of a number of pixels in a given output image frame and the number of positions,
wherein, when generating the output image frames, the at least one processor is configured to:
determine, based on the gaze point on the image plane at least a first input region and a second input region within each input image frame, wherein the first input region includes and surrounds the gaze point, and the second input region surrounds the first input region;
divide each input image frame into a plurality of groups of neighbouring input pixels based on a shifting sequence in which the light emanating from the given pixel is to be shifted to the plurality of positions, wherein a number of input pixels in a given group of neighbouring input pixels is equal to the number of positions in the plurality of positions; and
generate, from an $N^{th}$ input pixel in a given group of neighbouring input pixels within a first input region of an $N^{th}$ input image frame in the input sequence, a corresponding pixel for a first output region of an $N^{th}$ output image frame in the output sequence.

9. The display apparatus of claim 8, wherein, when generating the output image frames, the at least one processor is configured to combine input pixels in a given group of neighbouring input pixels within a second input region of an $M^{th}$ input image frame in the input sequence to generate a corresponding pixel for a second output region of an $M^{th}$ output image frame in the output sequence.

10. The display apparatus of claim 8, wherein the first output value of the given colour component of the given pixel in the first output image frame is generated from an input value of the given colour component of a first input pixel in a given group of neighbouring input pixels in a first input image frame, wherein the at least one processor is configured to:
detect whether or not an initial difference between the input value of the given colour component of the first input pixel and an input value of the given colour component of a second input pixel in the given group of neighbouring input pixels in the first input image frame lies within a second threshold value from the difference between the first output value and the initial second output value; and
when it is detected that the initial difference lies within the second threshold value from the difference between the first output value and the initial second output value, employ the initial second output value of the given colour component of the given pixel in the second output image frame, irrespective of whether or not the magnitude of the difference between the first output value and the initial second output value exceeds the first threshold difference.

11. A method of displaying, via a display apparatus comprising gaze-tracking means, an image renderer per eye, and a liquid-crystal device comprising a liquid crystal structure and a control circuit, wherein the liquid-crystal structure is arranged in front of an image-rendering surface of the image renderer, the method comprising:
electrically controlling the liquid-crystal structure, via the control circuit, to shift light emanating from a given pixel of the image renderer to a plurality of positions in a sequential and repeated manner, the given pixel comprising at least one colour component;
processing gaze-tracking data, collected by the gaze-tracking means, to determine a gaze direction of a user's eye;
determining, based on the gaze direction of the user's eye, a gaze point on an image plane of the image-rendering surface at which the user is gazing;
displaying a first output image frame via the image renderer;
detecting whether or not a magnitude of a difference between a first output value of a given colour component of the given pixel in the first output image frame and an initial second output value of the given colour component of the given pixel in a second output image frame exceeds a first threshold difference, wherein the second output image frame is to be displayed subsequent to the first output image frame;
when it is detected that the magnitude of the difference between the first output value and the initial second output value exceeds the first threshold difference, updating the initial second output value in the second output image frame to a sum of the first output value and a product of a distance factor and a difference between the initial second output value and the first output value, wherein the distance factor is a function of a distance of the given pixel from the gaze point on the image plane; and
displaying the second output image frame via the image renderer.

12. The method of claim 11, wherein the distance factor decreases with an increase in the distance.

13. The method of claim 11, wherein the distance is measured in degrees as an angular distance between the given pixel and the gaze point, wherein the distance factor has a value that lies in a range of 1-5 for the angular distance that lies in a range of 0-30 degrees.

14. The method of claim 11, wherein the distance is measured in pixels, wherein the distance factor has a value that lies in a range of 1-5 for the distance that lies in a range of 1-1800 pixels.

15. The method of claim 11, wherein different distance factors are employed for different colour components of the given pixel.

16. The method of claim 11, further comprising:
quantizing the initial second output value of the given colour component of the given pixel by dividing the initial second output value with a quantization factor, to generate an intermediate second output value of the given colour component; and
adding a given noise-signal value to the intermediate second output value to generate a given output value of the given colour component.

17. The method of claim 16, further comprising determining the given noise-signal value using a noise generator function or a noise texture lookup, based on pixel coordinates of the given pixel.

18. The method of claim 11, further comprising processing an input sequence of input image frames to generate an output sequence of output image frames, wherein a number of input image frames in the input sequence and a number of output image frames in the output sequence are equal to a number of positions in the plurality of positions, and wherein a number of pixels in a given input image frame is equal to a product of a number of pixels in a given output image frame and the number of positions,
  wherein the step of generating the output image frames comprises:
    determining, based on the gaze point on the image plane, at least a first input region and a second input region within each input image frame, wherein the first input region includes and surrounds the gaze point, and the second input region surrounds the first input region;
    dividing each input image frame into a plurality of groups of neighbouring input pixels based on a shifting sequence in which the light emanating from the given pixel is to be shifted to the plurality of positions, wherein a number of input pixels in a given group of neighbouring input pixels is equal to the number of positions in the plurality of positions; and
    generating, from an $N^{th}$ input pixel in a given group of neighbouring input pixels within a first input region of an $N^{th}$ input image frame in the input sequence, a corresponding pixel for a first output region of an $N^{th}$ output image frame in the output sequence.

19. The method of claim 18, wherein the step of generating the output image frames further comprises combining input pixels in a given group of neighbouring input pixels within a second input region of an $M^{th}$ input image frame in the input sequence to generate a corresponding pixel for a second output region of an $M^{th}$ output image frame in the output sequence.

20. The method of claim 18, wherein the first output value of the given colour component of the given pixel in the first output image frame is generated from an input value of the given colour component of a first input pixel in a given group of neighbouring input pixels in a first input image frame, the method further comprising:
  detecting whether or not an initial difference between the input value of the given colour component of the first input pixel and an input value of the given colour component of a second input pixel in the given group of neighbouring input pixels in the first input image frame lies within a second threshold value from the difference between the first output value and the initial second output value; and
  when it is detected that the initial difference lies within the second threshold value from the difference between the first output value and the initial second output value, employing the initial second output value of the given colour component of the given pixel in the second output image frame, irrespective of whether or not the magnitude of the difference between the first output value and the initial second output value exceeds the first threshold difference.

* * * * *